Oct. 22, 1935.   S. VORECH ET AL   2,018,197
STEERING MECHANISM
Filed Jan. 28, 1933   2 Sheets-Sheet 2

INVENTORS
Stephen Vorech and
Stephen Johnson Jr.
BY
N. W. Parker
ATTORNEY

Patented Oct. 22, 1935

2,018,197

UNITED STATES PATENT OFFICE

2,018,197

STEERING MECHANISM

Stephen Vorech and Stephen Johnson, Jr., Pittsburgh, Pa., assignors to Bendix-Westinghouse Automotive Air Brake Company, Pittsburgh, Pa., a corporation of Delaware Application January 28, 1933, Serial No. 654,054

15 Claims. (Cl. 180—79.2)

This invention relates to a steering mechanism and more particularly to steering mechanisms of the power-operated type for use in connection with motor vehicles.

One of the objects of the present invention is to provide a novel power-operated steering mechanism for use in connection with motor vehicles whereby the vehicle may be steered with a comparatively slight expenditure of effort on the part of the operator.

Another object of the invention is to provide in an apparatus of the above character a novel construction which will permit its being readily and easily installed upon vehicles equipped with the usual manually-operated steering gears.

A further object is to provide a novel power-operated steering mechanism of such a nature that the operator in steering will encounter a predetermined resistance or feel proportionate to the force required to turn, in the same manner as that heretofore encountered in connection with manually-operable steering mechanisms, with the exception that the resistance or feel will be greatly diminished.

A still further object is to provide in a power-operated mechanism for motor vehicles a novel construction permitting a combined manual and power steering operation to be effected, if desired, and permitting also manual operation alone in the event of failure of power.

A still further object is to provide in a construction of the above character a novel arrangement of parts whereby the mechanism will automatically compensate for shimmying of the wheels of the vehicle to be steered.

Still another object is to provide in a power steering mechanism of the above type a relatively simple arrangement which is of light weight and of sturdy construction and which lends itself to ready adaptability for incorporation upon existing types of automotive vehicles having manually-operated steering mechanisms.

The above and other objects and novel features of the invention will appear more fully hereinafter from the following detailed description when taken in connection with the accompanying drawings, wherein there is illustrated one embodiment of the invention. It is to be expressly understood, however, that the drawings are for purposes of illustration only and are not designed as a definition of the limits of the invention, reference being had for this purpose to the appended claims.

Figure 1:
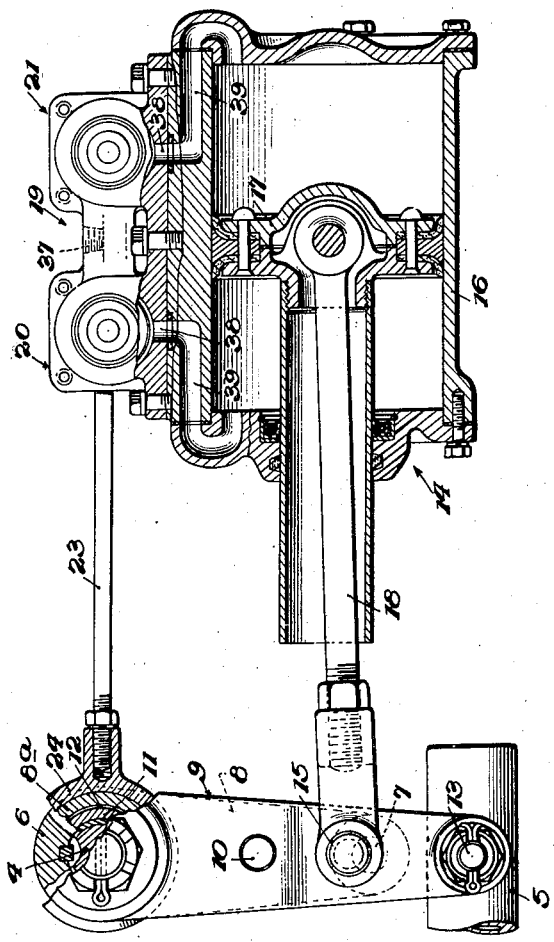
Figure 2:
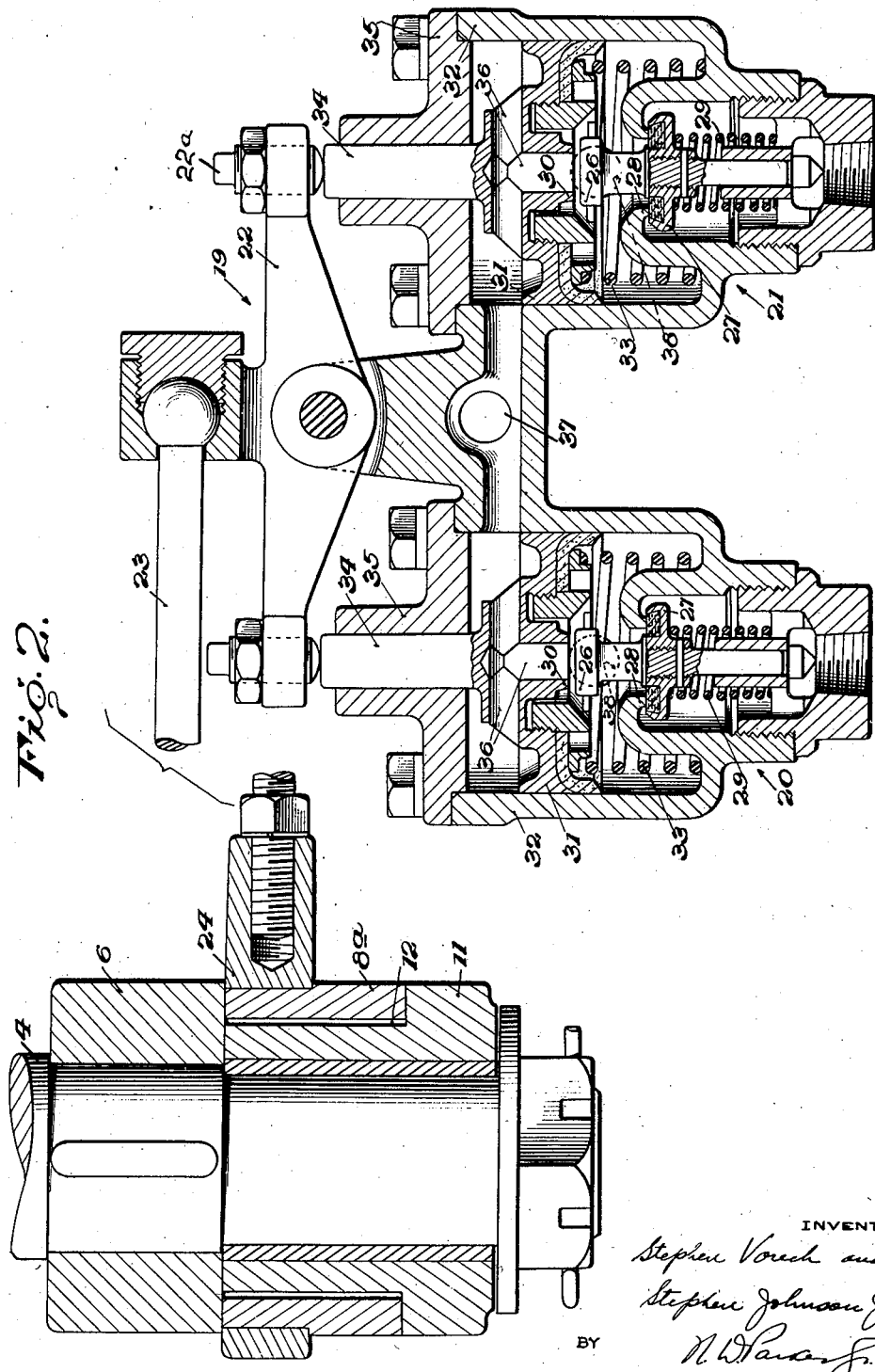

Referring to the drawings, wherein similar reference characters denote similar parts throughout the several views, Fig. 1 is a side view, partly in section, of a mechanism embodying the principles of the present invention;

Fig. 2 is a top view of the parts shown in Fig. 1 and illustrates the valve operating mechanism utilized in the present invention, and Fig. 3 is a transverse sectional view of certain parts of the mechanism illustrated in Fig. 1.

Referring more particularly to Figs. 1 and 2, the present invention is illustrated therein as including a manually-operable steering member or shaft 4, which may be rotated by any suitable operator-controlled means, not shown, and which is connected by means hereinafter to be described more in detail to a drag arm 5 forming a part of the steering mechanism usually encountered on motor vehicles, said drag arm being suitably connected to the dirigible wheels of a motor vehicle by connections, not shown, in order to steer the same in either direction.

Suitably secured to the shaft 4 is one end of a lever 6, the opposite end of which is pivotally connected as by means of a stub shaft 7 to one end of an intermediate lever 8, the opposite end of said last mentioned lever being formed with a hub portion 8ª surrounding but spaced from the shaft 4. The intermediate lever 8 is also pivotally connected to a power-operated lever or pitman arm 9 intermediate the ends of the latter as by means of a pivot pin or stub shaft 10 preferably formed integrally with the intermediate lever 8, one end of the lever 9 being provided with a laterally-extending bearing sleeve portion 11 rotatably mounted on the shaft 4 and being interposed between the latter and the hub 8ª, there being provided a slight space or lost motion 12 between these parts for a purpose which will appear more fully hereinafter.

In the form of the invention illustrated, the power-operated lever or pitman arm 9 is connected at its lower end to the drag arm 5 by means of a pin or other suitable means 13.

In order to effect power operation of the steering mechanism, there is provided a suitable power-actuating device 14, the actuated element of which is connected with the power lever or pitman arm 9 in any suitable manner, preferably intermediate the connection 13 and pivot 10 as by means of pivot pin 15. In the form shown, the power device is constituted by a fluid-receiving cylinder 16 of the double-acting type, the said cylinder being provided with a reciprocating piston 17 suitably connected to pin 15 as by means of a piston rod 18. Preferably, a fluid pressure differential is adapted to control the movement of the piston 17 in the cylinder 16 and the actuating medium for securing such pressure differential may be of any suitable nature, such as compressed air, the vacuum of the intake manifold of an internal combustion engine or a hydraulic medium. In the form shown, the flow of fluid under pressure is governed or controlled by means of a valve mechanism illustrated generally at 19. This valve mechanism comprises two valve assemblies, 20 and 21, of similar construction and each of these valves is adapted to be selectively operated by means of a rocker arm 22 pivotally mounted upon a portion of the cylinder 16 which latter is stationarily mounted. Referring more particularly to Fig. 2, the rocker arm 22 is adapted to be rocked in either direction to operate either valve 20 or valve 21 by means of a valve actuating rod 23 rigidly secured to a collar 24 surrounding the hub portion 8ᵃ of the lever 8.

Each of the valve mechanisms 20 and 21 includes a normally open exhaust valve 26 and a normally closed intake valve 27. Each of the latter valves is resiliently urged against a seat 28, integrally formed with the valve casing, by means of a spring 29. The exhaust valve 26 is adapted to cooperate with a seat 30 formed in a piston member 31, the latter being slidably received in the valve casing 32, and being normally urged upwardly as viewed in Fig. 2, as by means of a spring 33. A valve actuating stem 34 is slidably mounted in a cap 35 in the valve casing and is suitably connected or integrally formed with the piston 31, said connections including ports 36 permitting the free exhaustion of fluid under pressure below the piston 31 to an exhaust opening 37. Each of the valve casings is provided with an intake opening 38 which is connected to any source of fluid under pressure as for example, compressed air.

In operation, manual rotation of shaft 4 by any suitable means under the control of the operator will effect oscillatory movement of lever 6 about the shaft 4 as a pivot. Referring to Fig. 1 and considering the movement of the shaft 4 in a clockwise direction for example, the intermediate lever 8 will tend to rotate clockwise about pivot 10 due to the fact that the power-operated lever 9 is connected to the steering mechanism, which will offer an appreciable resistance to any tendency for the lever 9 to oscillate about shaft 4. The above described oscillatory movement of the intermediate lever 8 will cause the upper end thereof to be moved to the right, as viewed in Fig. 1, to move the valve operating rod 23 to the right, as viewed in Fig. 2, sufficiently to operate the valve mechanism 21 through the collar 24, such movement of the lever 8 being permitted by the lost motion 12 existing between the upper end 8ᵃ of this lever and the portion 11 of the arm 9. In operating the valve mechanism, the pivotal movement of rocker arm 22 caused by movement of the rod 23 will serve to move the actuating member 34 downwardly to first close the exhaust valve 26 whereupon continued downward movement of the member 34 and piston 31 connected thereto will open the intake valve 27 permitting fluid under pressure to pass from the supply into that portion of the valve chamber below the piston 31. Since this portion of the valve chamber is suitably connected as by means of opening 38 and duct 39 with the power device, fluid under pressure will pass into the latter to the right of piston 17 as viewed in Fig. 1 and effect a movement of the latter toward the left. By reason of the connection 15 between the piston and the pitman arm 9, the latter will be moved to the left as viewed in Fig. 1, about the shaft 4 as a pivot, and effect a movement of the drag arm 5 and steering mechanism connected thereto in the desired direction.

It will be observed from the above that immediately the intake valve 27 of the valve device 21 has been opened, fluid under pressure within the valve chamber below the piston 31 tends to move the latter upwardly, Fig. 2, and oppose the force tending to maintain the valves in operative position. It is therefore necessary, in order to continue the steering of the vehicle by power, to maintain the application of force upon the valve operating rod 23, by the operator-controlled means and levers heretofore described, and this force must be sufficient to overcome the above described action of the fluid under pressure upon the piston 31, which tends to move the latter upwardly.

As soon as the vehicle wheels have been steered or turned in the desired direction a sufficient amount, a lessening of the torque applied to the shaft 4 will effect a diminution in the force applied to the valve opening rod 23 until the valve mechanism becomes lapped, it being apparent that under these conditions, movement of the piston 17 to the left will tend to center the hub portion 8ᵃ of lever 8 about the shaft 4. However, if the application of torque to the shaft 4 is entirely discontinued, the hub portion 8ᵃ of the lever 8 will become centered about shaft 4 and the exhaust valve 26 will be opened to atmosphere, thus relieving the pressure of the fluid within the actuator 16.

It will be readily understood that the springs 33 are constructed in such a manner as to readily yield during the usual operation of the steering mechanism in order to permit substantially instantaneous power operation of the latter with extremely slight effort on the part of the operator. However, under certain circumstances, it may be desirable to steer the vehicle manually and to permit the operation of the power mechanism only when a predetermined resistance to manual steering has been encountered, thus conserving the supply of fluid under pressure, and utilizing power steering only when a condition arises when it is difficult to steer manually. In such event, it is only necessary to construct the springs 33 in such a manner that they will oppose the tendency of the valve operating rod 23 to compress them, during operation of the steering mechanism when only slight resistance to steering is encountered, but will, as soon as a predetermined resistance is reached, yield sufficiently to permit operation of the mechanism by power.

It will be appreciated from the above that the construction of the steering mechanism of the present invention is such as to enable a feel or resistance to steering to be reflected in the steering shaft 4 in order that the operator may experience substantially the same proportionate reaction to steering which would be encountered during normal manual operation of the steering apparatus but to a lesser degree. For example, as soon as sufficient of the lost motion between the hub portion 8ᵃ of the lever 8 and the shaft 4 has been taken up to operate the valve mechanism and fluid under pressure is being conveyed to the power cylinder 16, it will be observed that the pressure exerted on the under side of piston 31 tending to move the latter upwardly and move rod 23 and collar 24 connected thereto, to the left, as viewed in Fig. 2, which in effect tends to rotate the lever 8 in a counterclockwise direction about pivot 10, as viewed in Fig. 1, exerts a certain predetermined resistance to the rotation of shaft 4 and pivotal movement of the lever 6. This resistance is directly proportional to the degree of pressure under the piston 31 and this pressure is in turn proportional to the power required for steering. In other words, if the steering apparatus is turned through a slight angle, the pressure beneath piston 31 will be relatively low as compared with the pressure required to move the steering apparatus through a considerably larger angle. Thus, substantially simultaneously with the actuation of the steering shaft 4 by the operator to effect a movement of the upper end of lever 9 to the right, as viewed in Fig. 1, the operation of the valve mechanism will cause a reaction to be exerted which is conveyed to the operator through the steering shaft 4. Such an arrangement is extremely advantageous, as will be appreciated, in that the usual resistance or reaction offered to steering will be readily noted by the operator.

In the event that the operator wishes to steer the wheels of the vehicle in the opposite direction or return to a straight course from that which the vehicle has previously been steered, the steering shaft 4 is moved in such a manner that the upper end of the lever 9 will be moved to the left, as viewed in Fig. 1, thus effecting operation of the valve 20 to supply fluid under pressure to the left hand end of the power cylinder 16. Movement of the piston 17 in response to the fluid under pressure will then effect a counterclockwise rotation of lever 9 about the shaft 4 as a pivot and upon completion of the desired turn, the steering operation may be discontinued in a manner similar to that above described. It is to be pointed out that the construction is such that as soon as sufficient of the lost motion between the hub portion 8ª of lever 8 and the steering shaft 4 has been taken up, to place the selected valve mechanism in operation, continued rotation of the shaft 4 will also add the manual effort of the operator to the power operation of the steering shaft by reason of the abutting engagement between the hub of the lever 8 and shaft 4 providing of course that the shaft 4 is rotated at a relatively rapid rate.

One of the features of the present invention and embodied in the construction heretofore described resides in the elimination or counteraction of shimmy or oscillation of the steering apparatus, a condition which is extremely undesirable and which it has been proposed heretofore to eliminate in manually-operable steering mechanisms by various types of means. Since the operation of the valve mechanisms 20 and 21 is dependent not only upon the position of lever 6 but also upon the position of the arm 9, it will be readily understood that any reaction or shimmy in the steering mechanism which would be reflected in the drag arm 5 would effect an operation of either of the valve mechanisms. For example, consider that the steering mechanism has received a shock tending to move the drag arm 5 to the right, as viewed in Fig. 1. This movement of the drag arm will move the arm 9 in a counterclockwise direction about the shaft 4 since the power device is open to atmosphere, and since the lever 6 is stationary the intermediate lever 8 is pivoted in a clockwise direction about its connection at 7 with the lever 6. Such movement of the intermediate member will effect a movement of the valve operating rod 23 to the right and will open valve 21 admitting fluid under pressure to the right of piston 17, movement of which will through piston rod 18 move the arm 9 in a counterclockwise direction about the shaft 4, thus substantially simultaneously opposing the reaction which was encountered by the steering mechanism. It will be observed that this reaction will be substantially neutralized or compensated since the extent of movement of the arm 9 to oppose the reaction is entirely dependent upon the initial movement of the arm 9 caused by the reaction and which as above described opens the valve mechanism placing the power actuator into operation. The operation of this device in this respect is also in opposition to any reaction in the steering mechanism in the event that the same is being power operated. If the reaction tends to move the steering apparatus in the same direction as it is being moved by the power actuator, the invention herein will serve to oppose the reaction by either decreasing the supply of fluid under pressure to the power actuator in the event of a slight resistance or even reversing the action of the power actuator in the event of increased resistance. In the event that the resistance or reaction tends to oppose the movement of the steering mechanism in response to operation of the power actuator, the construction of the parts is such that more fluid under pressure will be admitted to the power actuator and will thus effectively compensate for the reaction or resistance encountered.

It will be readily apparent from the structure hereinbefore described, that since the power actuator is normally in communication with the atmosphere through the restricted exhaust valve openings, the said actuator will function as a dash-pot to dampen vibrations or oscillations of small amplitude of the vehicle wheels which might be insufficient to operate the valve mechanism as above described. Thus the present invention serves not only to counteract or oppose reactions of large amplitude in the steering mechanism due to road shock, but also serves to prevent oscillations or vibrations of small amplitude.

In order to increase the dash-pot action of the power actuator described above, the valve mechanisms may be so adjusted as to normally maintain the actuator reservoir under pressure. To this end, the adjusting members 22ª carried by the ends of the valve operating rocker arm 22 may be so adjusted as to normally maintain the exhaust valves 26 closed and the intake valves 27 slightly open. Fluid under pressure will consequently be normally conducted to both sides of the power actuator.

There is thus provided by the present invention a power steering mechanism of relatively simple construction comprising few parts which may be economically manufactured and readily installed upon motor vehicles equipped with manually-operable steering apparatus. The provision of the lever intermediate the manually-operated and power-operated levers for controlling the valve mechanism governing the power device insures that the latter will be governed at all times in its operation by the relative position of the two first named levers with respect to each other, to the end that the operation of said power device will be substantially coincident with movement of either of said levers with respect to the other for rendering the same operative or inoperative. In addition to the above, the present invention provides, during its operation, means for automatically eliminating shimmy or steering shock, which is highly desirable in a steering mechanism of the power-operated type, as it will be readily perceived that the steering of the vehicle will be rendered much more accurate thereby, as well as insuring increased safety in operation.

While one embodiment only has been illustrated and described, it will be readily understood by those skilled in the art that various changes, substitutions and rearrangements of the component parts may be resorted to without departing from the spirit of the invention. It will also be understood that any suitable medium may be employed for exerting a fluid pressure differential upon the power actuator in order to secure power operation of the latter. Reference will therefore be had to the appended claims for a definition of the limits of the invention.

What is claimed is:

1. A motor vehicle power steering mechanism having a manually-rotatable shaft, a lever having one end thereof secured to said shaft, a pitman arm having one end thereof journaled on said shaft, an intermediate lever pivotally connected to both said lever and said arm and having an end surrounding, but spaced from, said shaft, a power actuator operatively connected with said pitman arm, and means controlled by pivotal movement of said intermediate lever with respect to said first lever and arm for governing the operation of said actuator.

2. A motor vehicle power steering mechanism comprising a manually-rotatable shaft, a lever having one end thereof surrounding and secured to said shaft, a pitman lever having one end thereof rotatably supported on said shaft, the other end of said pitman lever being connected to a drag arm, an intermediate lever having one end thereof surrounding, but spaced from said shaft to provide lost motion therebetween, means for pivotally connecting the free ends of said first and intermediate levers together, means for pivotally connecting said pitman lever to said intermediate lever intermediate the ends of the latter, a power actuator operatively connected to said pitman lever intermediate the end thereof connected with the drag arm and the pivotal connection between the pitman lever and the intermediate lever, and means responsive to pivotal movement of said intermediate lever with respect to said first and pitman levers for controlling the operation of said power actuator.

3. A motor vehicle power steering mechanism comprising a manually-movable member having oscillatory movement for steering, an oscillatable pitman arm parallel with said member and adapted to be power-operated, said arm and member being oscillatable about the same axis, and means interposed between said member and arm and pivotally connected to both for controlling the application of power to said arm.

4. A motor vehicle power steering mechanism comprising a manually-movable member having oscillatory movement for steering, an oscillatable steering member parallel with said first member, both of said members being oscillatable about the same axis, power means operatively connected to said steering member, and means including a lever pivotally connected to both said members for controlling said power means.

5. In a power steering apparatus for motor vehicles having a manually-operable member, a power-operated member parallel with said first member, and means pivotally connected to both said members for controlling the application of power to said power-operated member, one end of said members and means being coaxially arranged.

6. In a power steering apparatus for motor vehicles having a manually-operated member, a power-operated member parallel with said first member, power means for operating said second member, and means pivotally connected to one of said members and operatively connected with the other for governing operation of said power means, one end of said members and means being substantially aligned.

7. In a power steering apparatus for motor vehicles having a manually-operable steering member, a power-operated steering arm parallel with said member, means for mounting one end of each said member and arm coaxially, and means for controlling the application of power to said arm including a member pivotally connected with said arm and operable by said steering member.

8. In a power steering apparatus for motor vehicles having a manually-operable steering member, a power-operated steering arm, means for mounting one end of each said member and arm coaxially, and means for controlling the application of power to said arm including a member pivotally connected with said arm and operable by said steering member, said pivotally-connected member having an end associated with said mounting means through a lost motion connection.

9. In a power steering apparatus for motor vehicles having a manually-operable steering member, a steering arm parallel with said member, a fluid pressure operated piston operatively connected with said arm and adapted to move the latter in either of two directions, valvular means for controlling the flow of fluid under pressure to either side of said piston, and means for actuating said valvular means in accordance with movements of said steering member and of said steering arm, said last named means including an intermediate member pivotally connected to said steering member and arm.

10. In a motor vehicle power steering mechanism comprising a manually-movable member, a lever operatively connected with said member for oscillatory movement for steering, a second lever adapted to be power-operated, and means controlling the application of power to said second lever comprising a member operatively connected with both said levers and having a lost motion connection with said manually-movable member.

11. A motor vehicle power steering mechanism having a manually-operable member, a power-operated member adapted to be connected with wheels to be steered, a double-acting power actuator for moving said power member in either direction, valvular means for controlling the admission and exhaust of fluid under pressure to and from said power actuator, a lever pivotally connected to both of said members and movable relative to either, and a valve operating rod operatively connected with said lever and said valvular means for controlling the latter in accordance with the relative movement between said lever and said members.

12. A motor vehicle power steering mechanism having a manually-rotatable shaft, a plurality of levers on said shaft, one of said levers being secured thereto and the remaining levers being free of said shaft, a single double-acting fluid pressure operated power actuator for operating one of said remaining levers in either direction, control means for admitting and exhausting fluid under pressure to and from said power actuator, and means operable by another of said remaining levers and dependent upon relative movement between the latter and said lever secured to the shaft for controlling the operation of said control means.

13. A motor vehicle power steering mechanism comprising a manually-operable steering shaft, a drag link, and means for connecting said shaft and link comprising a pitman arm connected at one end with said link, the other end being rotatably mounted on said shaft, said other end having a hub extending laterally along said shaft, a double-acting power cylinder having a piston connected with said arm intermediate the ends thereof, valve means for controlling the flow of fluid under pressure to either end of said cylinder, a valve control lever having one end thereof operatively connected with said steering shaft, the other end of said valve control lever having a laterally-extending hub formed thereon and loosely surrounding the laterally-extending hub of said pitman arm, means for pivotally connecting said valve control lever to said pitman arm intermediate the connection between the latter and said piston and the hub end of said arm, a valve operating collar rotatably mounted on the hub of said valve control lever, and means for operatively connecting said collar and valve means.

14. A motor vehicle power steering mechanism having a manually-operable member, a power-operated member adapted to be connected with wheels to be steered, a fluid-operated double-acting motor for moving said second named member in either direction, valvular means for controlling the admission and exhaust of fluid under pressure to and from said motor, a lever pivotally connected at one end to said manually-operable member, means for pivotally connecting said lever intermediate the ends thereof to said power-operated member, and a valve operating device operatively connected with the other end of said lever and said valvular means for controlling the latter in accordance with the relative movement between said lever and said members.

15. A motor vehicle power steering mechanism having a manually-rotatable shaft, a lever secured to said shaft and depending therefrom, a power-operated lever having one end thereof rotatably supported by said shaft and one end adapted to be connected with wheels to be steered, a fluid-operated double-acting motor for moving said power-operated lever in either direction, valve means for controlling the admission and exhaust of fluid to and from said motor, a valve controlling lever pivotally connected at one end to said first lever and pivotally connected intermediate its ends to said second lever and movable relative to either of said first or second levers, and a valve operating member operatively connected with said valve controlling lever and said valve means for controlling the latter in accordance with the relative movement between said valve controlling lever and said first and second levers.

STEPHEN VORECH.
STEPHEN JOHNSON, Jr.